US007486270B2

(12) United States Patent
Shih

(10) Patent No.: US 7,486,270 B2
(45) Date of Patent: Feb. 3, 2009

(54) ELECTROMAGNETIC INDUCTION ELECTRONIC BOARD WITH ANTENNA ARRAYED IN GRIDDING INSIDE

(75) Inventor: Hsuan-Ming Shih, Chungli (TW)

(73) Assignee: Tai Guen Enterprise Co., Ltd., Taoyuan Hsien (TW)

( * ) Notice: Subject to any disclaimer, the term of this patent is extended or adjusted under 35 U.S.C. 154(b) by 909 days.

(21) Appl. No.: 10/500,419

(22) PCT Filed: Sep. 27, 2002

(86) PCT No.: PCT/CN02/00689

§ 371 (c)(1),
(2), (4) Date: Jun. 25, 2004

(87) PCT Pub. No.: WO03/056418

PCT Pub. Date: Jul. 10, 2003

(65) Prior Publication Data

US 2005/0052424 A1    Mar. 10, 2005

(30) Foreign Application Priority Data

Dec. 29, 2001   (CN)  ............................. 01 2 79677 U
Sep. 17, 2002   (CN)  ............................... 02 1 30933

(51) Int. Cl.
*G08C 21/00*   (2006.01)
(52) U.S. Cl. ................. 345/156; 178/18.07; 178/19.03; 345/157; 345/173; 345/905; 343/700
(58) Field of Classification Search ............. 178/18.07, 178/19.03; 345/173–179, 156, 157, 905; 343/700
See application file for complete search history.

(56) References Cited

U.S. PATENT DOCUMENTS

| 3,747,114 | A | * | 7/1973 | Shyhalla ...................... 343/795 |
| 5,635,684 | A | * | 6/1997 | Fukuzaki ................. 178/18.07 |
| 5,903,252 | A | * | 5/1999 | Ogata ......................... 345/105 |
| 6,094,176 | A | * | 7/2000 | Van Hoozen et al. ..... 343/792.5 |
| 6,380,930 | B1 | * | 4/2002 | Van Ruymbeke ........... 345/173 |
| 6,788,294 | B2 | * | 9/2004 | Takala et al. ................ 345/173 |
| 6,847,355 | B1 | * | 1/2005 | Nishikawa et al. .......... 345/173 |
| 7,170,468 | B2 | * | 1/2007 | Knopf ........................ 345/1.3 |

FOREIGN PATENT DOCUMENTS

| JP | 02-153419 | 6/1990 |
| JP | 09-305317 | 11/1997 |
| JP | 11-110135 | 4/1999 |
| JP | 2000-172421 | 6/2000 |
| JP | 2000-172424 | 6/2000 |

* cited by examiner

*Primary Examiner*—Bipin Shalwala
*Assistant Examiner*—Vince E Kovalick
(74) *Attorney, Agent, or Firm*—J.C. Patents

(57) ABSTRACT

An electronic whiteboard with built-in membrane antenna array lattice electromagnetic induction layer includes: a writing input portion; a covering frame provided around the periphery of the electronic whiteboard; and a control circuit; wherein, the writing input portion has multilayer structure and is enclosed in the frame, the said writing input portion includes a surface writing layer, an underlayer, and an input induction layer which is connected to the control circuit by its output; the said induction layer may be the antenna array printed on the insulation membrane and arranged along the X, Y axes, therein the area enclosed by each lattice unit constitutes one induction cell.

19 Claims, 5 Drawing Sheets

ELECTROMAGNETIC INDUCTION ELECTRONIC BOARD WITH ANTENNA ARRAYED IN GRIDDING INSIDE

TECHNICAL FIELD

The present invention relates to an electronic whiteboard, particularly to an electronic whiteboard with built-in membrane antenna array lattice electromagnetic induction layer, which is easy to manufacture, has lower cost, and possesses high accuracy of identification. The present invention belongs to the field of the electronic technology.

BACKGROUND ART

Whiteboard is often used in work and life to make record or discuss. For example, in teaching and meeting, the character, symbol and so on can be written on the whiteboard and can be erased conveniently. However, the content written on traditional whiteboard is appeared only one time; it can't be stored and reproduced. Therefore, traditional whiteboard dose not satisfy the requirement of current digitized life and work.

Electronic whiteboard is used in teaching environment in school and is used in studying and discussing procedure in a department, along the development of electronic technology. Such product can promptly convert the symbols written on the whiteboard into electronic signal, then transfers the electronic signal to a computer connected thereto. Editing, printing, transmission and remote information switching etc. can be completed immediately by the computer. For existing electronic whiteboard with large induction area, it is impossible to manufacture the electromagnetic induction typed electronic whiteboard by, for example, etching the printed circuit board, and it is also impossible to manufacture the resistance-induction typed electronic whiteboard by using the touching screen because of high cost. Therefore, the ultrasonic wave transmission and reception between input pen and electronic whiteboard is used in order to control and operate. But such product is not applied widely due to the high cost and low accuracy. Therefore, this phase of information generation and intercourse can't be digitized widely and fast.

In conclusion, existing product has many disadvantages, such as: very low identification ratio, poor accuracy, high cost, and difficulty in manufacture, which limit wide application of such product.

SUMMARY OF THE INVENTION

The object of the present invention is to overcome the disadvantages of the prior art, to provide an electronic whiteboard with built-in membrane antenna array lattice electromagnetic induction layer which has lower cost, simple manufacturing procedure, and high accuracy of data acquisition and identification.

Another object of the present invention is to provide an electronic whiteboard with built-in membrane antenna array lattice electromagnetic induction layer, which has long operating life and is maintained easily.

The object of the present invention is achieved by the following technical solution:

An electronic whiteboard with built-in membrane antenna array lattice electromagnetic induction layer includes: a writing input portion; a covering frame provided around the periphery of the electronic whiteboard; and a control circuit; wherein, the writing input portion has multilayer structure and is enclosed in the frame; the said writing input portion includes a surface writing layer, an underlayer, and an input induction layer which is provided between the surface writing layer and the underlayer and is connected to the control circuit by its output; the said induction layer may be the antenna array printed on the insulation membrane and arranged along the X, Y axes, therein the area enclosed by each lattice unit constitutes one induction cell.

The area of said induction layer is same as those of the writing layer and the underlayer, or smaller than those of the writing layer and the underlayer, that is, the induction layer is sandwiched coincidently or partly between the writing layer and the underlayer. The induction layer is positioned at the side or center of the writing scope of the writing input portion.

A shield layer is provided after the induction layer in order to enhance the anti-interference ability of the device. Simultaneously, a buffering layer is provided between the induction layer and the under layer, or a buffering layer is provided between the induction layer and the shield layer.

The said induction layer may be the antenna array printed on the insulation membrane and arranged along the X, Y axes; therein the area enclosed by each lattice unit constitutes one induction cell. The insulation membrane may be film material in order to cut the cost. The induction layer may be the antenna array formed by etching the copper-platinum covering the insulation membrane, may be the antenna array formed by flexible printed circuit (FPC), and may be the antenna array formed by the silver paste or the mixture material of the silver paste and the carbon paste which is printed on the insulation membrane.

The induction layer can be printed on two surfaces of the insulation membrane, or printed on one surface of the insulation membrane, and there are two layers of insulation membrane in which one is overlaid on the other.

Two or more induction layers are overlaid together and the induction cells on respective induction layers are set to interlace each other, so as to improve the accuracy of the electronic whiteboard. The interval sizes of the said induction cells on respective layers may be same or different.

In order to enlarge the writing area of the electronic whiteboard, the area of the induction layer should be enlarge correspondingly, and the large electromagnetic induction layer can be made up by a plurality of pieces of membrane with antenna array formed by etching or printing, wherein the X, Y directional antenna array eduction electrical connection means are provided on each piece of membrane, and said each piece of membrane is connected by means of the wire eduction electrical connection means.

Said connection means is one of the following: pin-type connection means, flexible printed circuit means, PIN-PIN connection means, welding spot (VGA) thermal-melted connection means, ultrasonic welding device, solder-plate welding device, puncture-type connection means.

Said control circuit includes circuits for signal amplification, filtering and acquisition, data processing, and is provided with signal output control circuit and/or memory unit. Said signal output unit includes electrical cable with standard computer data interface or wireless data switching means (RF transceiver).

Said signal output unit is connected to a computer and/or a printer, or an external data storage device, or connected to a telephone line by auxiliary modem.

The control circuit and the induction layer are integrated by direct connection, the components of the control circuit are positioned on the output of the antenna array, and the control circuit is positioned in the body.

The control circuit is connected to the output of the antenna array formed by flexible printed circuit (FPC), on which the components of the control circuit are set directly.

The said components of the control circuit are mounted on a printed circuit board which is separated from the induction layer; the output of the antenna array of the induction layer is connected to the corresponding input terminal on the printed circuit board by means of pressure-connection, plug-in connection or welding-connection.

The said output of the antenna array of the induction layer is positioned between a hard sheet and a printed circuit board. A buffering layer is provided between the hard sheet and the output of the antenna array. The hard sheet, buffering layer and the output of the antenna array are overlaid on the printed circuit board by means of the screwing-conjunction. The output of the antenna array is connected with corresponding input terminal on the printed circuit board.

The said control circuit is integrated with the body, and it can be positioned in the covering frame which is around the periphery of the body.

The control circuit is positioned outside the body, and connected to the body through the electrical connection means. The output of the antenna array of the induction layer is connected with the output interface of the induction layer by means of pressure-connection, plug-in connection or welding-connection. On the control circuit, an interface which can match the electrical connection means of the induction layer is provided.

The said output of the antenna array of the induction layer is positioned between a hard sheet and a printed circuit board. A buffering layer is provided between the hard sheet and the output of the antenna array. The hard sheet, buffering layer and the output of the antenna array are overlaid on the electrical connection means by means of the screwing-conjunction. The output of the antenna array is connected with corresponding input terminal on the electrical connection means.

The output interface of the induction layer and the interface of the control circuit may be one of the following: pin-type connection means, flexible printed circuit means, PIN-PIN connection means, welding spot (VGA) thermal-melted connection means, ultrasonic welding device, solder-plate welding device, puncture-type connection means.

A bracket is provided outside the body frame, and the body is mounted on the bracket. The said control circuit is positioned in the bracket, the interface is set on the bracket, and the output interface of the induction layer is set at a place in the body corresponding to the interface of the control circuit.

The writing input portion and the protecting frame around the writing input portion is made by flexible and windable material, in order to give convenience of carrying, storage and usage.

One side edge of the body are set into a spool and fixed. Wring-springs are mounted on the both end of the spool for winding up the body. A fixing buckle is provided on another side edge of the body. Said control circuit can be provided in the spool.

After studying of the above-mentioned technical solutions, it is known that the present invention possesses the following advantages: simple and reasonable structure; simple manufacturing process; highly reduced cost of the electronic whiteboard; convenience of maintenance; highly improved induction accuracy. The electronic whiteboard according to the invention has resolved the problem of the digitalization in this phase, which is a new kind of digitized product and has created an application mode that the electronic whiteboard is used as main channel for intercommunion.

MODE OF CARRYING OUT THE INVENTION

The present invention will be explained in detail with reference to the drawings and embodiments.

EMBODIMENT ONE

Figure 1:
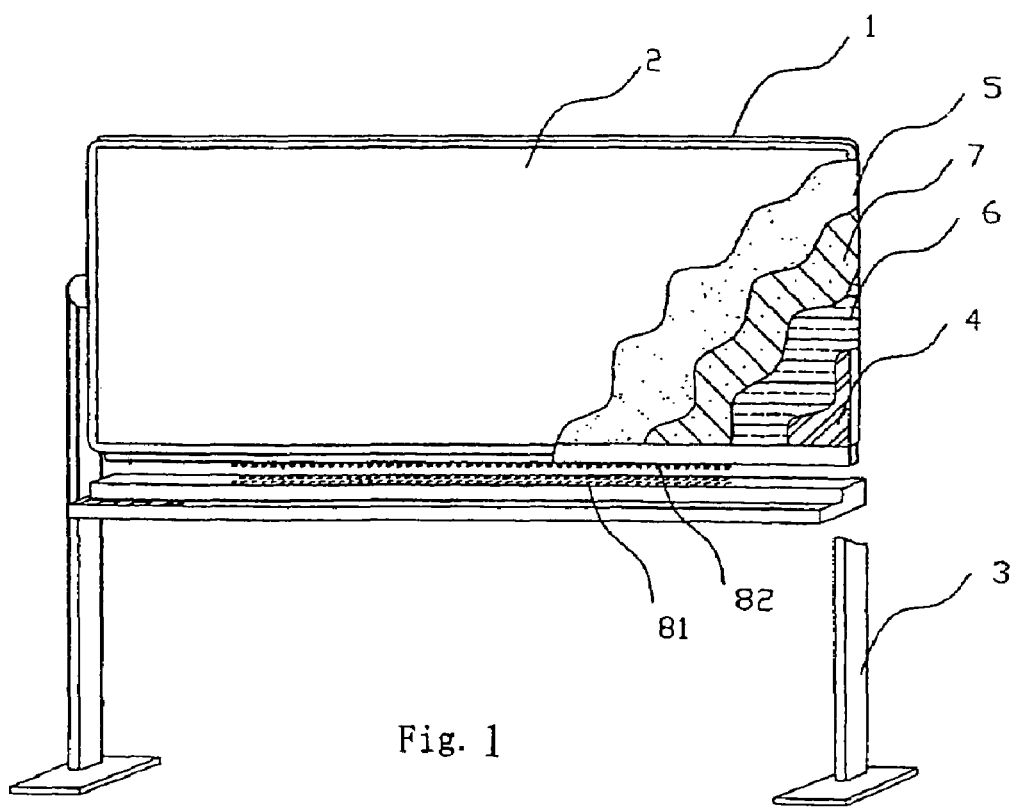
FIG. 1 is a diagram showing the spatial structure of the embodiment one according to the present invention.

As shown in FIG. 1, an electronic whiteboard with built-in membrane antenna array lattice electromagnetic induction layer according to the present invention includes: a writing input portion; a covering frame 1 provided around the periphery of the electronic whiteboard; and a control circuit; wherein the writing input portion has multilayer structure and is enclosed in the frame. The writing input portion includes a surface writing layer 2, an underlayer 4, and input induction layer 5 which is provided between the writing layer 2 and the underlayer 4 and is connected to the control circuit by its output.

As shown in FIG. 1, a shield layer 6 is provided after the induction layer 5 in order to enhance the anti-interference ability of the device, said shield layer 6 can efficiently overcome the electromagnetic interference to the operation of the control circuit from induction layer 5.

A buffering layer 7 is provided between the induction layer 5 and the underlayer 4, or a buffering layer 7 is provided between the induction layer 5 and the shield layer 6. The buffering layer 7 is used to keep a reasonable space among the induction lay, the writing surface and the shield layer 6. Furthermore, the electromagnetic signal is transmitted from the pen in the both cases that the pen is pressed down and the pen is not pressed down, so as to control conveniently. Certainly, in a modification of the invention, the electromagnetic signal is not transmitted in the case that the pen is not pressed down. Furthermore, the pen can be provided with pressure induction means in order to sensing the pressure by using different frequency.

Figure 2:
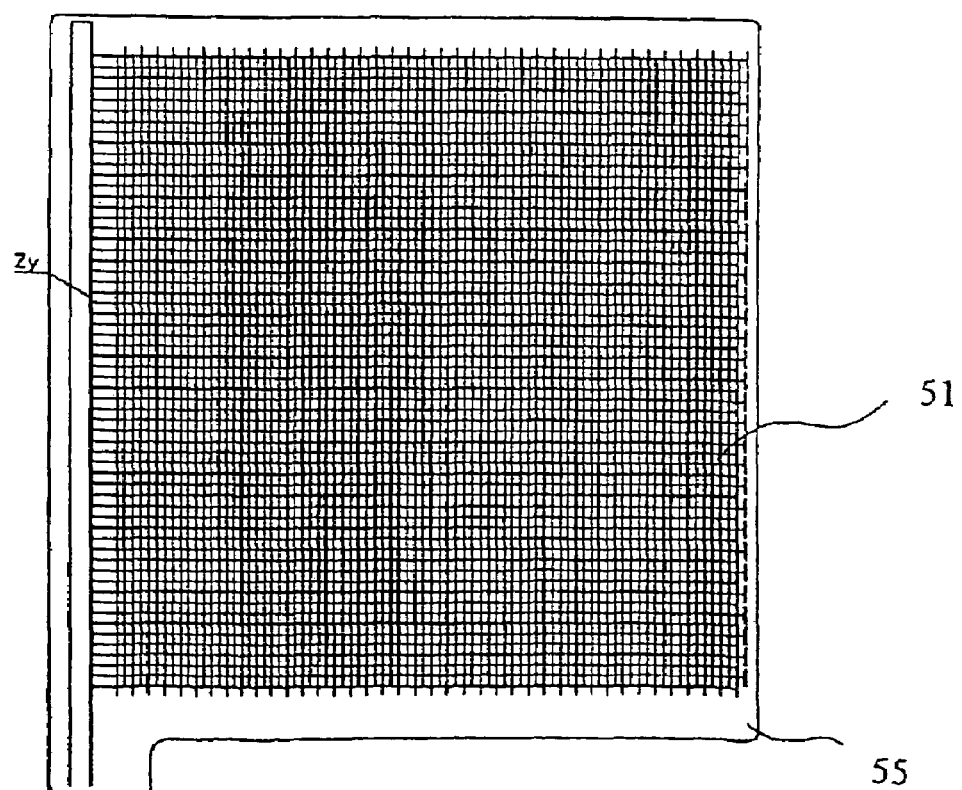
FIG. 2 is a diagram showing the structure of the antenna array of the induction layer in the present invention, which is etched or printed along y-axis.
Figure 3:
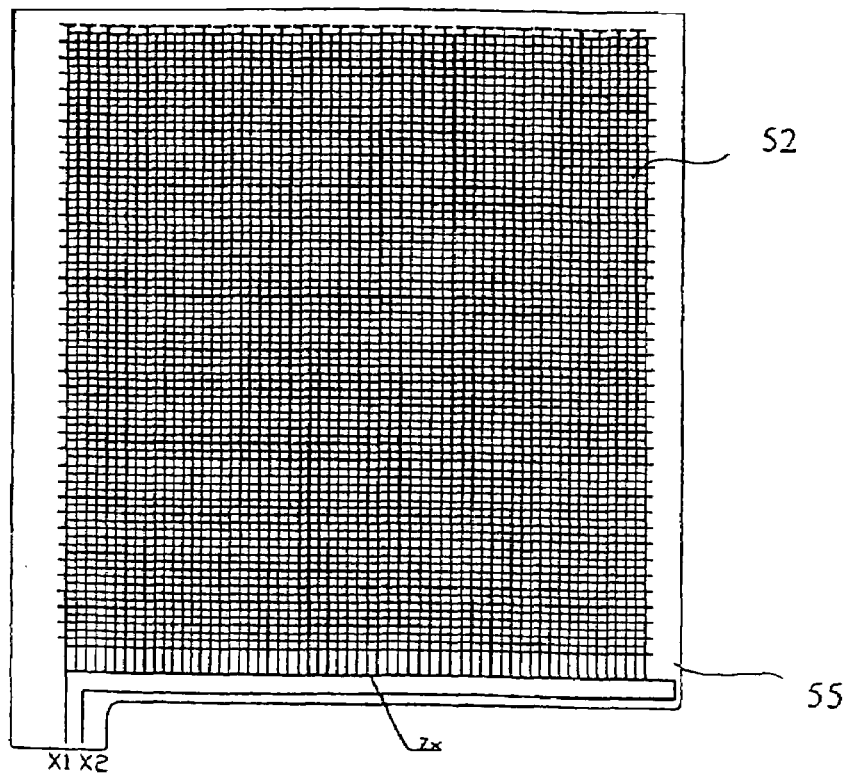
FIG. 3 is a diagram showing the structure of the antenna array of the induction layer in the present invention, which is etched or printed along X-axis.
Figure 4:
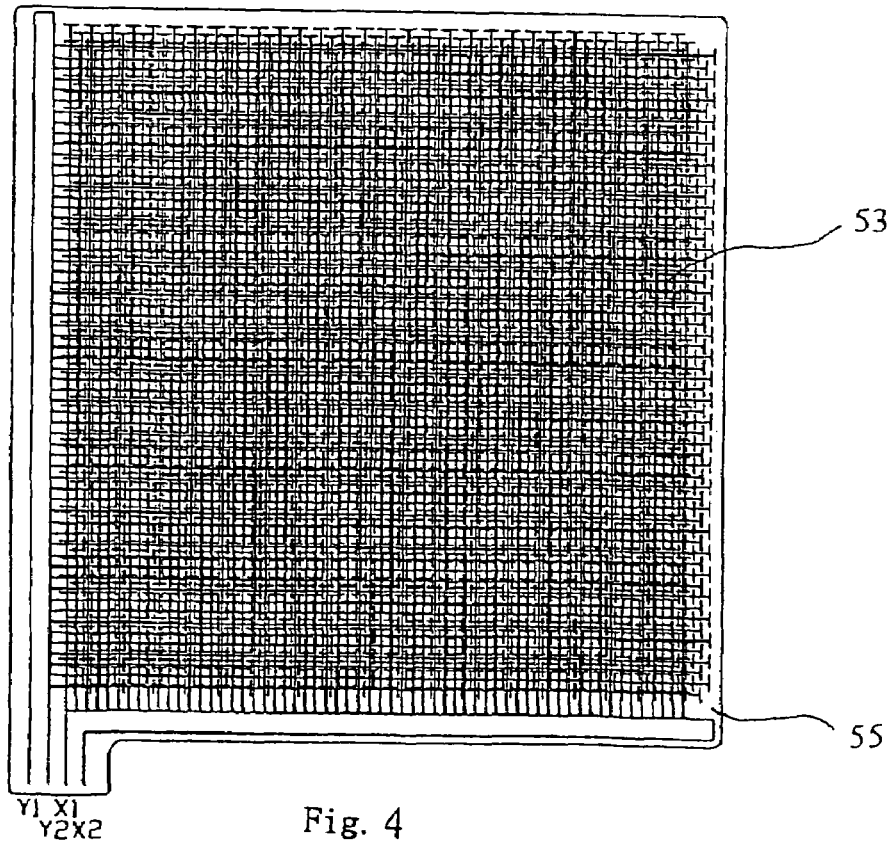
FIG. 4 is a diagram showing the whole structure of the induction cell formed by the X-Y directional antenna array of the induction layer in the present invention.

As shown in FIGS. 2, 3 and 4, the induction layer 5 may be the antenna array 52, 51 printed on the insulation membrane 55 and arranged along the X, Y axes, therein the area enclosed by each lattice unit constitutes one induction cell 53. The insulation membrane 55 may be film material in order to cut the cost. The induction layer 5 may be the antenna array formed by etching the copper-platinum covering the insulation membrane 55, may be the antenna array formed by flexible printed circuit (FPC), and may be the antenna array formed by the silver paste or the mixture material of the silver paste and the carbon paste which is printed on the insulation membrane.

The induction layer can be printed on two surfaces of the insulation membrane, or printed on one surface of the insulation membrane, and there are two layers of insulation membrane in which one is overlaid on the other.

Figure 7:
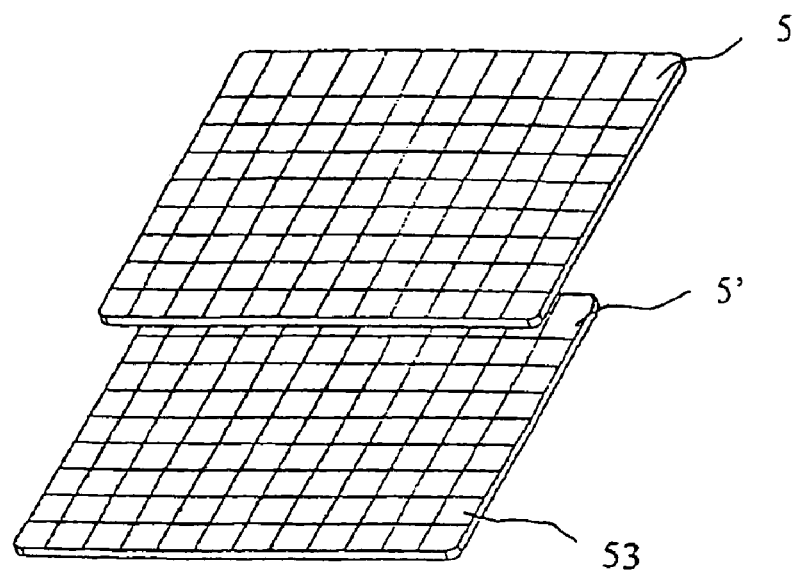
FIG. 7 is a diagram showing the structure of two induction layers overlaid one by one according to the present invention.

As shown in FIG. 7, two or more induction layers 5 and 5' are overlaid together and the induction cells 53 on each induction layer are set to interlace each other, so as to improve the accuracy of the electronic whiteboard. The interval sizes of the induction cells 53 on respective layers may be same or different. After the induction layers that each layer has different interval size of the induction cells 53 are overlaid together, the scale unit of the coordinates is consequentially shorten, so the accuracy of induction is improved. In the case that the induction layers having same size of the induction cells 53 are overlaid together, because the induction cells 53 on different induction layers are set to interlace each other, the scale unit of the coordinates can also be shorten, and so the sensitivity of the electronic whiteboard is improved.

Figure 6:
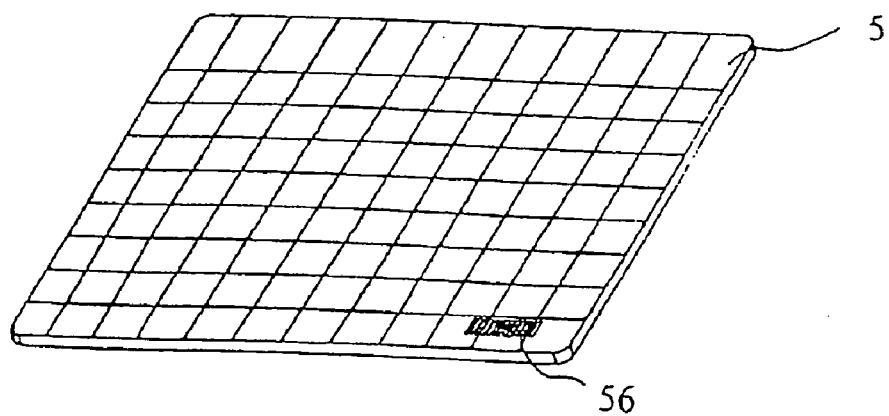
FIG. 6 is a diagram showing the structure of the induction layer made up by more than one pieces and the electrical connection interface.
Figure 6:
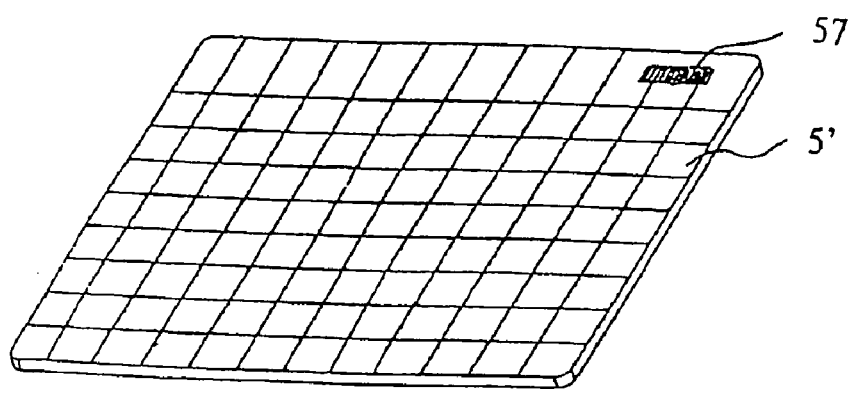

As shown in FIG. 6, if the writing area of the electronic whiteboard is large, the area of the induction layer should be enlarge correspondingly, and the large electromagnetic induction layer can be made up by a plurality pieces of wire electromagnetic induction layer with membrane, such as electromagnetic induction layers 5 and 5', wherein the X-Y directional eduction electrical connection means 56 and 57 are provided on each piece of electromagnetic induction layer, and said each piece of electromagnetic induction layer is connected by means of the wire eduction electrical connection means 56 and 57.

Said connecting means 56 and 57 may be one of the following: pin-type connection means, flexible printed circuit means, PIN-PIN connection means, welding spot (VGA) thermal-melted connection means, ultrasonic welding device, solder-plate welding device, puncture-type connection means.

The signal output unit of the electronic whiteboard may be the cable connection means or wireless data switching means. Particularly, the cable connection means may be an electrical cable with USB connector; the wireless data switching means may be a RF transceiver. With above configuration, local storage or remote transmission can be performed, or an internet access means can be set immediately, so the contents of input can be packed as packet and then transmitted. Certainly, the signal output unit is connected to a computer and/or a printer, so as to immediately edit and/or print the induction-collected information on the whiteboard. Furthermore, the signal output unit is connected directly to a data storage device, so as to store the data and then import said data into a computer or other appliance by means of a portable memory device. The specific circuit configuration and connection mode between the signal output unit and peripheral are similar to those in other consumer electronic products, so related description about them is omitted.

The control circuit and the induction layer are integrated by direct connection, the components of the control circuit are positioned on the output of the antenna array, and the control circuit is positioned in the body.

The control circuit is connected to the output of the antenna array formed by flexible printed circuit (FPC), on which the components of the control circuit are set directly.

The components of the control circuit are mounted on a printed circuit board which is separated from the induction layer; the output of the antenna array of the induction layer is connected to the corresponding input terminal on the printed circuit board by means of pressure-connection, plug-in connection or welding-connection.

Figure 9:
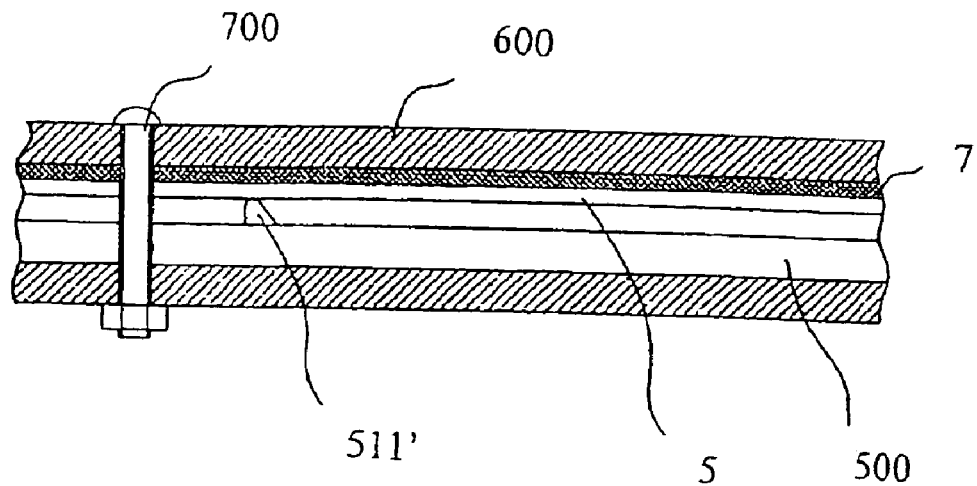
FIG. 9 is a diagram showing the connection between the output of the antenna array and the corresponding input terminal of the printed circuit board according to the present invention.

As shown in FIG. 9, the output of the antenna array of the induction layer is positioned between a hard sheet 600 and a printed circuit board 500. The buffering layer 7 is provided between the hard sheet 600 and the output of the antenna array. The hard sheet 600, the buffering layer 7 and the output of the antenna array are overlaid on the printed circuit board 500 by means of the screwing-conjunction of the screw 700. The output of the antenna array is connected with the corresponding input terminal 511'on the printed circuit board.

When the control circuit is integrated with the body, it can be positioned in the covering frame which is around the periphery of the body.

Figure 8:
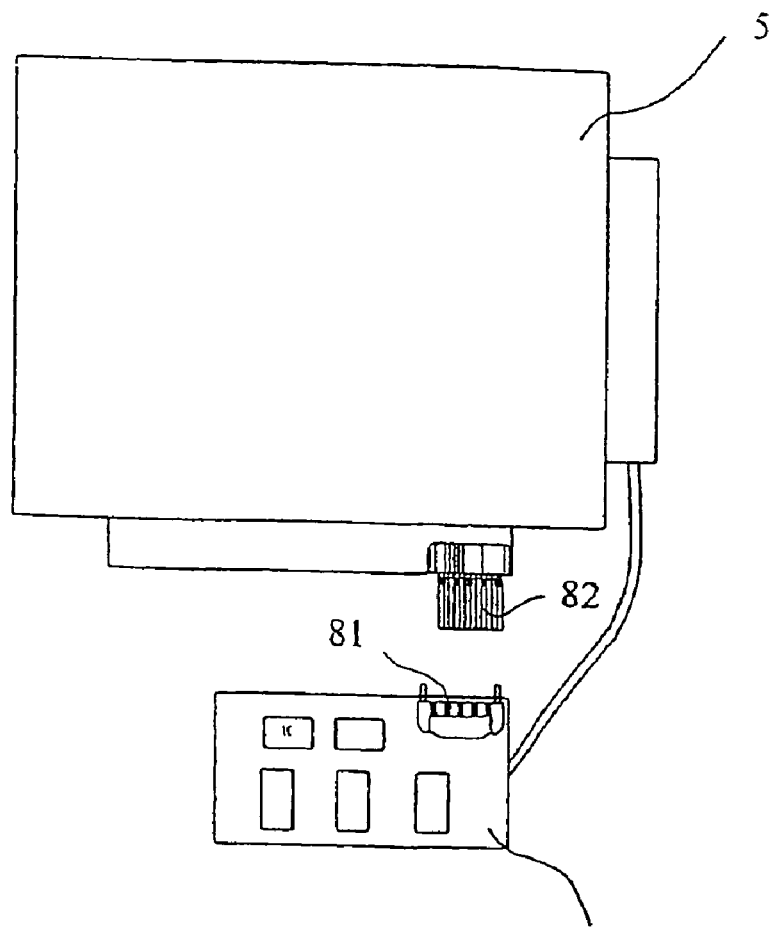
FIG. 8 is a diagram showing the connection between the induction layer and the control circuit which are separated according to the present invention.

As shown in FIG. 8, the control circuit 8 is positioned outside the body, and connected to the body through the electrical connection means. The output of the antenna array of the induction layer 5 is connected with the output interface 82 of the induction layer by means of pressure-connection, plug-in connection or welding-connection. On the control circuit, an interface 81 which can match the electrical connection means of the induction layer is provided.

The output interface 82 of the induction layer and the interface 81 of the control circuit may be one of the following: pin-type connection means, flexible printed circuit means, PIN-PIN connection means, welding spot (VGA) thermal-melted connection means, ultrasonic welding device, solder-plate welding device, puncture-type connection means.

In the case that the control circuit is separated from the body, it is convenient to make system upgrade of the electronic whiteboard and to maintain and repair.

As shown in FIG. 1, a bracket 3 is provided outside the body frame 1, and the body frame 1 is mounted on the bracket 3. The control circuit 8 is positioned in the bracket 3, the interface is set on the bracket 3, and the output interface 82 of the induction layer is set in a place corresponding to the interface 81 of the control circuit.

Figure 5:
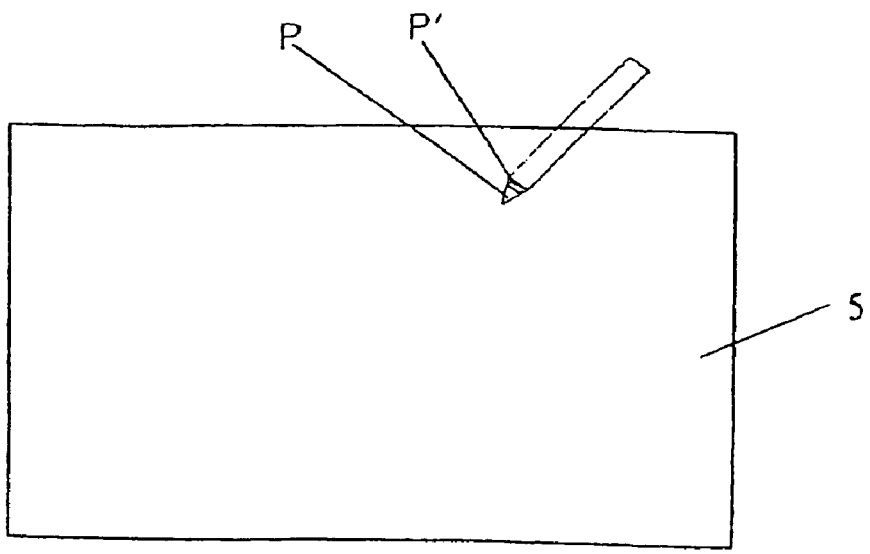
FIG. 5 is a diagram showing the principle of the generation of the induction signal and location identification for the input pen.

The operation mechanism of the present invention is as shown in FIG. 5. In FIG. 5, P is the signal input terminal of the pen, and there is a bigger conductor P' on the head of the pen. The plane coordinates of pen are detected, so as to determine the location of the pen.

The electromagnetic pen transmits electromagnetic signal continuously. When the pen-point touches the induction generation device, said electromagnetic signal passes through the induction antenna at the corresponding location, and then the antenna at this location induces a signal. The location signal induced by the induction generation device is transferred to the input terminal of the control identification circuit through the wire lead on X, Y direction. After array selecting, control process, band-pass filtering, detection-rectification and A/D conversion, the resultant location signal is transferred to the processing circuit and calculated by the CPU, so as to determine the location coordinates of the electromagnetic signal on the induction antenna and various operation statuses. Above data or information is sent to a computer, thereby to control the computer to identify, display, record and so on.

Furthermore, in order to obtain the pressure of pen-point as writing and to improve the induction accuracy of the location signal, a Z-axis directional pressure sensor is provided in the tail of the pen-point, and the output of the sensor is connected to the control terminal of the electromagnetic wave generation device, so the transmitted electromagnetic wave signal can be changed by means of pressure-touching, thereby the pressure (input signal) of the pen-point can be identified more reliably.

Further, the signal output unit of the electronic whiteboard may be the cable connection means or wireless data switching means. Particularly, the cable connection means may be electrical cable with USB connector; the wireless data switching means may be a RF transceiver. Certainly, the signal output unit can be connected to a computer and/or a printer, so as to immediately edit and/or print the induction-collected information on the whiteboard. Furthermore, the signal output unit is connected directly to a data storage device, so as to store the data and then import said data into a computer or other appliance by means of a portable memory device. The specific circuit configuration and connection mode between the signal output unit and peripheral are similar to those in other consumer electronic products, so related description about them is omitted.

The output data induced and acquired by the whiteboard according to the present invention are identified data, and the data are transformed into the data of the motion track of the pen. Otherwise, said-above output data are unidentified data, i.e. coordinates data of the pen at respective time points.

EMBODIMENT TWO

Figure 10:
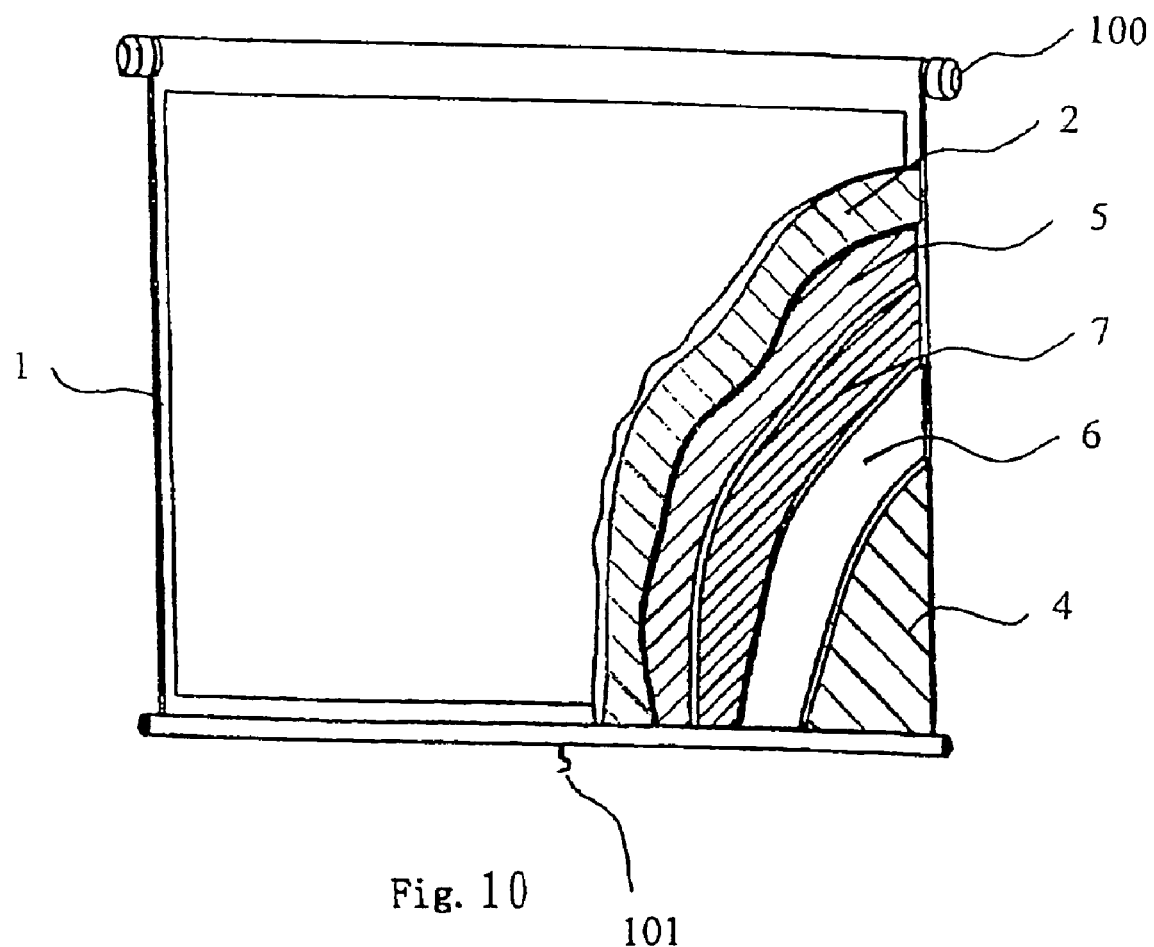
FIG. 10 is a diagram showing the spatial structure of the embodiment two according to the present invention.

As shown in FIG. 10, a portable electronic whiteboard with built-in wire lattice electromagnetic induction layer according to the present invention includes: a writing input portion; a protecting frame provided around the periphery of the electronic whiteboard; and a control circuit; wherein the writing input portion has multilayer structure and is enclosed in the protecting frame. The writing input portion includes a surface writing layer 2 and an underlayer 4. An input induction layer 5 which is provided between the writing layer 2 and the underlayer 4 is connected to the control circuit by its output. The writing input portion and the protecting frame 1 around the writing input portion is made by flexible and windable material.

As shown in FIG. 10, one side edge of the body are set into a spool 100 and fixed. Wring-springs for winding up the body are mounted on the both end of the spool 100. A fixing buckle 101 is provided on another side edge of the body.

As shown in FIG. 10, the surface writing layer 2, the induction layer 5, the buffering layer 7, the shield layer 6 and the underlayer 4 of the electronic whiteboard are all made by windable and flexible material, in order to give convenience of carrying, hanging and storing. One side edge of the body are set into the spool 100 and fixed. Wring-springs for winding up the body are mounted on the both end of the spool 100. A fixing buckle 101 is provided on another side edge of the body, which is used for fixing of the electronic whiteboard as it has been wound up. The spool, the wring-spring and the related mechanism are similar to those of the existing projection screen curtain, existing winding window curtain and so on, so the detailed description about them is omitted. The electronic whiteboard which can be furled has the advantages: convenience of carrying, storage and usage; benefit of sparing space. The control circuit can be provided in the spool 100, in order to give a beautiful, integrated exterior.

Other technical features of the present embodiment are same as the embodiment one, the detailed description about them can be referred to the corresponding contents of embodiment one, so it is omitted herein.

Above embodiments are used only to explain the present invention, but not to limit the present invention. In despite of the detailed description of the present invention with referring to above preferred embodiments, it should be understand that various modifications, changes or equivalent replacements can be made by those skilled in the art without depart from the spirit and scope of the present invention. All of the modifications, changes or equivalent replacements should be covered in the append claims of this application.

The invention claimed is:

1. An electronic whiteboard with built-in membrane antenna array lattice electromagnetic induction layer, including: a writing input portion; a covering frame provided around the periphery of the electronic whiteboard; and a control circuit; wherein the writing input portion has a multilayer structure and is enclosed by the frame, said writing input portion includes a surface writing layer, an underlayer, and an input induction layer which is provided between the surface writing layer and the underlayer and is connected to a control circuit by its output, characterized in that: said induction layer comprises an antenna array etched or printed on an insulation membrane and arranged along with X, Y axes of the electronic whiteboard, wherein an area enclosed by each lattice unit formed by the antenna array constitutes one induction cell; said insulation membrane is a film material.

2. The electronic whiteboard with built-in membrane antenna array lattice electromagnetic induction layer according to claim 1, characterized in that: a shield layer is provided after the induction layer in order, to enhance the anti-interference ability of the device.

3. The electronic whiteboard with built-in membrane antenna array lattice electromagnetic induction layer according to claim 1, characterized in that: a buffering layer is provided between the induction layer and the underlayer, or a buffering layer is provided between the induction layer and the shield layer, and the buffering layer is used to keep a space among the induction layer, the writing surface and the shield layer.

4. The electronic whiteboard with built-in membrane antenna array lattice electromagnetic induction layer according to claim 1, characterized in that: the antenna array is formed by etching a copper-platinum covering on the insulation membrane.

5. The electronic whiteboard with built-in membrane antenna array lattice electromagnetic induction layer according to claim 1, characterized in that: the antenna array is formed by a silver paste or a mixture of silver paste and carbon paste which is printed on the insulation membrane.

6. The electronic whiteboard with built-in membrane antenna array lattice electromagnetic induction layer according to claim 1, characterized in that: said induction layer consists of two or more layers, and the induction cell on respective induction layers are set to interlace each other; interval sizes of said induction cells on respective layers are same or different.

7. The electronic whiteboard with built-in membrane antenna array lattice electromagnetic induction layer according to claim 1, characterized in that: said induction layer is made up by a plurality of pieces of membrane with antenna array formed thereon by etching or printing, wherein a X-Y directional antenna array education electrical connection means is provided on each piece of membrane, and said each piece of membrane is connected by means of the X-Y directional antenna array education electrical connection means.

8. The electronic whiteboard with built-in membrane antenna array lattice electromagnetic induction layer according to claim 7, characterized in that: said X-Y directional antenna array education electrical connection means is one of the following: pin-type connection means, flexible printed circuit means, PIN-PIN connection means, welding spot (VGA) thermal-melted connection means, ultrasonic welding device, solder-plate welding device, puncture-type connection means.

9. The electronic whiteboard with built-in membrane antenna array lattice electromagnetic induction layer according to claim 1, characterized in that: components of the control circuit are mounted on a printed circuit board which is separated from the induction layer, the output of the antenna array of the induction layer is connected to a corresponding input terminal on the printed circuit board by means of pressure-connection, plug-in connection or welding-connection.

10. The electronic whiteboard with built-in membrane antenna array lattice electromagnetic induction layer according to claim 9, characterized in that: the output of the antenna array of the induction layer is positioned between a hard sheet and the printed Circuit board; a buffering layer used to keep a space between the hard sheet and the output of the antenna array is provided between the hard sheet and the output of the antenna array; the hard sheet, buffering layer and the output of the antenna array are overlaid on the printed circuit board by means of the screwing-conjunction; the output of the antenna array is connected with the corresponding input terminal on the printed circuit board.

11. The electronic whiteboard with built-in membrane antenna array lattice electromagnetic induction layer according to claim 1, characterized in that: the control circuit is positioned outside the body of the electronic whiteboard, and connected to the body through an electrical connection means; the output of the antenna array of the induction layer is connected with an output interface of the induction layer by means of pressure-connection, plug-in connection or welding-connection; on the control circuit, an interface which matches the electrical connection means of the induction layer is provided.

12. The electronic whiteboard with built-in membrane antenna array lattice electromagnetic induction layer according to claim 11, characterized in that: said output of the antenna array of the induction layer is positioned between a hard sheet and a printed circuit board; a buffering layer used to keep a space between the hard sheet and the output of the antenna array is provided between the hard sheet and the output of the antenna array; the hard sheet, the buffering layer and the output of the antenna array are overlaid on the printed circuit board by means of screwing-conjunction; the output of the antenna array is connected with a corresponding input terminal on the electrical connection means.

13. The electronic whiteboard with built-in membrane antenna array lattice electromagnetic induction layer according to claim 11, characterized in that: the output interface of the induction layer and the interface of the control circuit are one of the following: pin-type connection means, flexible printed circuit means, PIN-PIN connection means, welding spot (VGA) thermal-melted connection means, ultrasonic welding device, solder-plate welding device, puncture-type connection means.

14. The electronic whiteboard with built-in membrane antenna array lattice electromagnetic induction layer according to claim 1, characterized in that: a bracket is provided outside the frame, and the body of the electronic whiteboard is mounted on the bracket.

15. The electronic whiteboard with built-in membrane antenna array lattice electromagnetic induction layer according to claim 14, characterized in that: said control circuit is positioned in the bracket, the interface of the control circuit is set on the bracket, and the output interface of the induction layer is set at a place in the body of the electronic whiteboard corresponding to the interface of the control circuit.

16. The electronic whiteboard with built-in membrane antenna array lattice electromagnetic induction layer according to claim 1, characterized in that: said writing input portion and the covering frame around said writing input portion are made by flexible and windable material; so that the body of the electronic whiteboard can be furled and carried conveniently.

17. The electronic whiteboard with built-in membrane antenna array lattice electromagnetic induction layer according to claim 16, characterized in that: one side edge of the body is set into a spool and fixed; wring-springs are mounted on both ends of the spool for winding up the body; a fixing buckle is provided on another side edge of the body.

18. The electronic whiteboard with built-in membrane antenna array lattice electromagnetic induction layer according to claim 17, characterized in that: said control circuit is provided in the spool.

19. The electronic whiteboard with built-in membrane antenna array lattice electromagnetic induction layer according to claim 1, characterized in that: the induction layer is printed on two opposite surfaces of the insulation membrane.

* * * * *

UNITED STATES PATENT AND TRADEMARK OFFICE
CERTIFICATE OF CORRECTION

PATENT NO. : 7,486,270 B2  Page 1 of 1
APPLICATION NO. : 10/500419
DATED : February 3, 2009
INVENTOR(S) : Shih et al.

It is certified that error appears in the above-identified patent and that said Letters Patent is hereby corrected as shown below:

On the title page of the patent grant, please replace item (73) Assignee's name from "Tai Guen Enterprise Co., Ltd." to --Taiguen Technology (Shen_Zhen) Co., Ltd.--

Signed and Sealed this

Sixteenth Day of March, 2010

David J. Kappos
*Director of the United States Patent and Trademark Office*